United States Patent
Keller

(10) Patent No.: US 10,099,451 B2
(45) Date of Patent: Oct. 16, 2018

(54) PROCESS FOR PRODUCING LAMINATED GLASS COMPOSITES WITH PROPERTIES PROVIDING SHIELDING FROM THERMAL RADIATION

(71) Applicant: KURARAY EUROPE GMBH, Hattersheim (DE)

(72) Inventor: Uwe Keller, Bonn (DE)

(73) Assignee: KURARAY EUROPE GMBH, Hattersheim (DE)

( * ) Notice: Subject to any disclaimer, the term of this patent is extended or adjusted under 35 U.S.C. 154(b) by 224 days.

(21) Appl. No.: 15/036,500

(22) PCT Filed: Nov. 27, 2014

(86) PCT No.: PCT/EP2014/075853
§ 371 (c)(1),
(2) Date: May 13, 2016

(87) PCT Pub. No.: WO2015/078989
PCT Pub. Date: Jun. 4, 2015

(65) Prior Publication Data
US 2016/0263866 A1 Sep. 15, 2016

(30) Foreign Application Priority Data
Nov. 29, 2013 (EP) ..................................... 13195122

(51) Int. Cl.
| | | |
|---|---|---|
| *B32B 17/10* | (2006.01) | |
| *C08J 7/04* | (2006.01) | |
| *C08J 7/06* | (2006.01) | |
| *C09D 5/32* | (2006.01) | |
| *B32B 37/14* | (2006.01) | |
| *G02B 5/20* | (2006.01) | |

(52) U.S. Cl.
CPC .... *B32B 17/10036* (2013.01); *B32B 17/1022* (2013.01); *B32B 17/10174* (2013.01); *B32B 17/10201* (2013.01); *B32B 17/10761* (2013.01); *B32B 37/14* (2013.01); *C08J 7/04* (2013.01); *C08J 7/06* (2013.01); *C09D 5/32* (2013.01); *B32B 2250/40* (2013.01); *B32B 2307/412* (2013.01); *B32B 2605/006* (2013.01); *G02B 5/208* (2013.01)

(58) Field of Classification Search
CPC ................................................ B32B 17/10036
See application file for complete search history.

(56) References Cited

U.S. PATENT DOCUMENTS

| | | | |
|---|---|---|---|
| 3,437,552 A * | 4/1969 | Bowen | ................... B32B 17/10 156/106 |
| 7,312,275 B2 | 12/2007 | Papenfuhs et al. | |
| 7,358,304 B2 | 4/2008 | Papenfuhs et al. | |
| 7,511,096 B2 | 3/2009 | Papenfuhs et al. | |
| 7,528,192 B2 | 5/2009 | Papenfuhs et al. | |
| 9,028,644 B2 | 5/2015 | Keller | |
| 2006/0008658 A1* | 1/2006 | Fukatani | ................. B32B 17/10 428/437 |
| 2013/0050983 A1 | 2/2013 | Labrot et al. | |

FOREIGN PATENT DOCUMENTS

| | | |
|---|---|---|
| CA | 2 388 107 A1 | 5/2001 |
| EP | 1 235 683 B1 | 9/2002 |
| EP | 1 527 107 B1 | 5/2005 |
| EP | 1 606 325 | 12/2005 |
| EP | 2 409 833 A1 | 1/2012 |
| EP | 2 767 393 A1 | 8/2014 |
| WO | 03/020776 A1 | 3/2003 |
| WO | 2004/063231 A1 | 7/2004 |
| WO | 2005/059013 A1 | 6/2005 |

* cited by examiner

*Primary Examiner* — Daniel H Lee
(74) *Attorney, Agent, or Firm* — Brooks Kushman P.C.

(57) ABSTRACT

Heat shielding glass laminates are produced by laminating transparent panes with at least one film A having a low plasticizer content and a heat shielding coating thereon, and at least one film B having a high plasticizer content.

17 Claims, No Drawings

PROCESS FOR PRODUCING LAMINATED GLASS COMPOSITES WITH PROPERTIES PROVIDING SHIELDING FROM THERMAL RADIATION

CROSS REFERENCE TO RELATED APPLICATIONS

This application is the U.S. National Phase of PCT Appln. No. PCT/EP2014/075853 filed Nov. 27, 2014, which claims priority to European Application No. 13195122.0 filed Nov. 29, 2013, the disclosures of which are incorporated in their entirety by reference herein.

BACKGROUND OF THE INVENTION

1. Field of the Invention

The present invention relates to a method for the production of laminated glass panes with thermal radiation shielding properties using an interlayer film based on polyvinylacetal with a heat-shielding coating.

2. Description of the Related Art

For the production of laminated glass panes with heat shielding properties, among others, methods are customary in which thin IR-absorbing or reflecting coated PET-films are included between various layers of polyvinylacetal containing a plasticizer. It is disadvantageous that always at least 3 layers of film (1× functionalized PET, 2×PVB film) must be used, since PET can not be melted directly with the functionalized side or the backside on a glass surface.

If one does not consider different coating options of the glass surface, the alternative lies in the use of intermediate layers, which contain IR-absorber in the bulk. To this end, for example, nanoscale semiconductor particles, like ITO or ATO, are evenly distributed in the film's bulk during film production. In this case, a disadvantage lies in the limited recycling capacity of the film, which also gives rise to higher production costs. A further disadvantage lies in the difficulty of retaining the nanoscale distribution of particles in a film matrix during an extrusion process, in the presence of various other materials, in order to avoid the problem that agglomeration of nanoparticles does not give rise to an unacceptable turbidity. A further drawback lies in the higher complexity of film production, which causes, by combining the feature "heat absorbing" with further functional features like "acoustic attenuation", "band filter", "wedge-shaped thickness profile", and "color hue", a huge increase in product range for the manufacturer as well as for the processor.

As an alternative, WO 2005/059013 A1 proposes the application of heat absorbing nanoparticles by means of printing a PVB film with special print inks. However, printing can negatively affect the adhesion properties between the film and the glass surface. Due to the fact that PVB films, in order to have full removal of air during the lamination process, need to have a roughened surface, it is likely to result in an applied layer partially absorbing light even in the visible spectrum, which, after compressing with a glass surface, is optically uneven. Moreover, the printing of thick plasticized film bands is difficult, since these films elongate during unwinding, and then shrink again.

SUMMARY OF THE INVENTION

An object of the present invention is therefore to provide interlayer films with heat shielding properties, without the need for dispersing nanoscale semiconductor particles in the bulk of the interlayer film. It has been surprisingly found that thin films based on polyvinylacetal with low or zero plasticizers, having thereon at least one heat shielding layer, can be melted directly on one of the glass surfaces in the typical manufacturing process for laminated glass composites. Then, in combination with at least one layer of plasticized polyvinylacetal, the usual required safety properties of laminated glass composites can be obtained.

DETAILED DESCRIPTION OF THE PREFERRED EMBODIMENTS

The invention therefore provides a method for the production of a heat shielding laminated glass composite by bonding two transparent panes with at least one film A and at least one film B, characterized in that films A and B are positioned between the two transparent panes and bond these to each other, wherein film A has a polyvinylacetal PA and 0 to 16% by weight of at least one plasticizer WA as well as a heat shielding coating, and film B has a polyvinylacetal PB and at least 16% by weight of at least one plasticizer WB.

A heat shielding coating refers to layers of heat shielding material which are applied on the surface of the film, without the heat shielding material having to be dispersed in the bulk of the interlayer film. The heat shielding coating may be comprised of a flat layer completely or partially including film A, but also discrete structures, like conductor tracks, wires, networks built with the same, and dots, as well as combinations thereof.

The transparent panes may be identical or different, and may be made of glass, PMMA or polycarbonate. In the following the terms "glass pane" or "glass surface" are used as synonyms of "transparent pane" or "surface of the transparent pane".

The inventive method can be performed by positioning the intermediate layer on a transparent pane, by applying film A on a transparent pane on which film B and a second transparent pane are placed. Alternatively, it is possible to position film B on a transparent pane, onto which film A and a second transparent pane are placed.

In a first variant of this method, the transparent panes may be interconnected, i.e. bonded or laminated together according to the layer sequence film A/film B/film A.

In a second variant of this method, the transparent panes may be interconnected according to the layer sequence film B/film A/film B.

Heat shielding layers include those which, during a comparative measure and evaluation according to ISO 13837: 2008 (v=14 m/s; percentage) in a test laminate composed of 2×2.1 mm transparent glass (for instance, Planilux™ glass (St. Gobain)) and, as interposed film B, a standard automobile film (for instance, TROSIFOL VG R10 0.76) as well as one film A without coating and a correspondingly prepared laminate, in which film A has a coating, have following reduced Total Solar Transmittance (TTS):
TTS (film A without coating)−TTS (film A with coating) >10%, >12.5%, >15%, >17.5% or >20%.

Additionally, the coating according to the invention on film A may provide, in case of comparison of the test laminate, the advantage that light transmission in the test laminate (measured according to EN 410; 2011, percentage values) is reduced, by applying the heat shielding coating, to a lesser extent than the total solar energy transmittance TTS (according to ISO 13837:2008, v=14 m/s; percentage values).

Preferably, the inventive heat shielding coatings on film A have TL/TTS ratios higher than 1.2, and in order of increasing preference, higher than 1.25, higher than 1.30, higher than 1.35, higher than 1.40, or higher than 1.45.

Films A are provided on one of their two surfaces with a heat shielding coating. Heat shielding coatings in the present invention comprise coatings which absorb infrared radiation as well as coatings which reflect infrared radiation, as well as possible combinations of both mechanisms, in a coating or combinations of different absorbing and reflecting layers.

The heat shielding coating may be manufactured according to different methods, for example the uniform application of liquid suspensions on a film strip, dip coating, curtain coating, reverse gravure coating and slot die coating. In these cases, the suspension and the heat shielding coatings obtained from them preferably comprise heat absorbing semiconductor particles.

The coatings according to the invention may be completely comprised of heat shielding material, for example heat absorbing nanoparticles. Depending on the application method, the percentage by weight of heat shielding material in the heat absorbing coatings, after drying, may lie between 10% and 80% and preferably between 30% and 60%.

Alternatively to said processes, heat shielding layers can also be applied by means of printing processes on film A. In this case, it is also possible to print patterns of various geometries, such as a grid pattern or in the form of pixels. In addition to the heat-absorbing and/or reflecting material, printable mixtures or mixtures applied in a wet coating method contain one or more solvents and binders. Preferably the solvent contains water and/or alcohols such as methanol, ethanol. But it may also contain ethers such as butyl glycol, amides such as dimethylformamide (DMF) or plasticizers. As the binder, polyvinyl acetals, polyvinyl alcohols at different degree of hydrolysis, acrylic polymers and other polymers or condensates can be used. Preferably, the binder is a polyvinyl acetal or a polyvinyl alcohol. It is particularly preferred to use the same polyvinyl acetal which was also used for preparing film A as a binder.

When using semiconductor particles, ITO, ATO, AZO, IZO, zinc antimonate, tin-doped zinc oxide, silicon-doped zinc oxide, gallium-doped zinc oxide, tungstates such as $LiWO_3$, $NaWO_3$, $CsWO_3$, and lanthanum or cerium hexaborides may be included, for example, in the heat-shielding coating. Preferably, these materials are included in the form of finely dispersed particles, for example, so-called nanoparticles. Preferably, the size of the primary particles is less than 1 µm.

The coatings used in the invention preferably have layer thicknesses in the range of 1-50 µm, more preferably in the range of 2-30 µm, and most preferably in the range of 3-15 µm.

As an alternative to the above method, the heat-shielding coatings can also be obtained by chemical vapor deposition (CVD), physical vapor deposition (PVD), cathode pulverization (sputtering), or electrolytic deposition on film A. In the case of infra-red radiation reflecting coatings, these may contain, in addition to optionally present dielectric layers, metals such as silver, aluminum, gold, chromium, or indium. Coatings produced in this way have layer thicknesses in the range of 0.01-5 microns, preferably in the range of 0.05-2 microns.

In the following, the "initial state" is the state of films A and B prior to lamination, i.e. in a still separated condition.

Films A and B may contain, in the initial state prior to lamination of the layers as well as in the intermediate layer stack in the composite glass laminate, a single plasticizer or mixtures of plasticizers either of different or of the same composition. A different composition relates both to the type of plasticizers as well as their proportion in the mixture. Preferably, after lamination, that is, in the finished laminated glass, film A and film B contain the same plasticizer WA and WB. In a preferred variant, however, film A contains in its initial state no plasticizer, and after lamination, contains the plasticizer WB.

According to the invention, plasticizer-containing films B contain, in the initial state prior to lamination of the layers, at least 16% by weight, such as 16.1-36.0% by weight, preferably 22.0-32.0% by weight, and especially 26.0-30.0% by weight, of plasticizer WB.

Films A used in the invention, in the initial state prior to lamination of the layers, can contain less than 16% by weight (such as 15.9% by weight), and in order of increasing preference less than 12% by weight, less than 8% by weight, less than 6% by weight, less than 4% by weight, less than 3% by weight, less than 2% by weight, less than 1% by weight, in each case with the lower limit of 0% by weight, of plasticizer WA. Preferably, the low-plasticizer films A contain 0.0-8% by weight of plasticizer WA.

In the inventive method, in the initial state prior to lamination of the layers, film A has a thickness less than 20%, preferably 15%, and preferably less than 10% of the thickness of the film or films B. The thickness of film A includes the heat shielding coating.

The thickness of film A, in the initial state prior to lamination of the layers, is 10-150 µm, preferably 20-120 µm, more preferably 30-100 µm, yet more preferably 40-80 µm, and most preferably 50-70 µm. In laminated glass the thickness of film A increases by migration of plasticizers from film B.

Film A is separately manufactured from film B (e.g. by extrusion, and it has either no plasticizers or such a small percentage of plasticizer that, in the production and further processing, under mechanical stress, the film neither stretches too much nor has an excessive tack.

The thickness of film B in the initial state is 450-2500 µm, preferably 600-1000 µm, more preferably 700-900 µm. When using multiple films B, the same applies for the total thickness. If films B are stretched and/or additionally curved, conforming to the shape of a pane (for example, a windshield) before the preparation of the laminate, the indicated thicknesses can be further reduced at the time of lamination by up to 20%.

At least one thin film A having the heat shielding coating is oriented to a glass surface of the composite glass laminate of the invention. The film A may in this case be applied on the glass surface with the surface having the heat absorbing coating, or the surface without the heat absorbing coating facing the glass surface.

It is also possible to apply a film A on both glass surfaces, providing a laminated glass composite with a layer sequence of glass/film A/film B/film A/glass. Here, the "decoration" of films A may be the same or different. For example, while one of films A may have the heat shielding coating, the second film A may have other layers having optical functions or electric functions.

In the case of automotive glazing, for aesthetic reasons and durability, it is sometimes preferred to seal the edges of the laminated glass composites with sealants. This favors the susceptibility of such glazing towards formation of edge defects such as peeling among the layers (delamination) or corrosion or chemical modifications of the IR-reflecting or absorbing layer extending to the edge of the laminate.

In the novel method, the low-plasticizer film A can be cut to size and positioned so that it does not extend in the laminated glass composite everywhere up to the edge of the laminate. In particular, film A may be smaller in the edge region by at least 1 mm than at least one glass pane so that film B, in this edge region, is in direct contact with at least one glass pane.

Furthermore, in the initial state, the thin, low-plasticizer or plasticizer-free film A can be perforated before inserting it into the glass/film sandwich, so that it can have recesses such as openings, holes, slots in any geometrical pattern.

Thus, film A may have at least one recess, so that, through this recess, film B is in direct contact with at least one glass pane. After bonding to the finished laminated glass, film B with a higher plasticizer content in the initial state, is directly bonded to the glass panes at these locations. In particular, such recesses can be provided at positions of the laminated glass, behind which optics, antenna elements, and the like, which would otherwise be adversely affected in their function by a heat shielding layer, may be located.

The films A and B used in the invention comprise polyvinylacetals, which are produced by acetalization of polyvinyl alcohol or ethylene-vinyl alcohol copolymers.

The films may contain a plurality of polyvinylacetals, each with a different polyvinyl alcohol content, acetalisation degree, residual acetate content, ethylene content, or molecular weight, or with different chain lengths of the aldehyde in the acetal groups.

In particular, the aldehyde or keto-compounds used for producing the polyvinylacetals may be linear or branched (i.e., of the "n" or "iso" type) having 2 to 10 carbon atoms, which leads to corresponding linear or branched acetal groups. The polyvinylacetals are accordingly called "polyvinyl (iso) acetals" or "polyvinyl (n) acetals".

The polyvinyl(n)acetal used in the invention results primarily from the reaction of at least one polyvinyl alcohol with one or more aliphatic unbranched keto-compounds with 2 to 10 carbon atoms. Preferably, to this end, n-butyraldehyde is used.

The polyvinyl alcohols or ethylene-vinyl alcohol copolymers used to prepare the polyvinylacetals in the films A or B, can be identical or different, pure or be a mixture of polyvinyl alcohols or ethylene-vinyl alcohol copolymers with different degrees of polymerization or different degrees of hydrolysis.

The polyvinyl acetate content of the polyvinylacetals in the films A or B can be adjusted by using a polyvinyl alcohol or ethylene-vinyl alcohol copolymer saponified to a corresponding degree. The content of polyvinyl acetate affects the polarity of the polyvinylacetal, thus changing the plasticizer compatibility and the mechanical strength of each layer. It is also possible to carry out the acetalization of the polyvinyl alcohols or ethylene-vinyl alcohol copolymers with a mixture of various aldehydes or keto-compounds.

The films A and B can contain polyvinylacetals having the same or different proportion of polyvinyl acetate groups, for example, from 0.1 to 20 mol %, preferably 0.5 to 3 mol % or 5-8 mol %.

The polyvinyl alcohol content of the polyvinylacetal PA of the lower-plasticizer film A, in the initial state, can be, in order of increasing preference, 6-26% by weight, 8-24% by weight, 10-22% by weight, 12-21% by weight, 14-20% by weight, 16-19% by weight, and most preferably 16 to 21% by weight or 10 to 16% by weight.

The polyvinyl alcohol content of the polyvinylacetals PB of the higher-plasticized film B, in the initial state, can be 14-26% by weight, 16-24% by weight, 17-23% by weight and preferably from 18 to 21% by weight.

Films A and B preferably contain uncrosslinked polyvinylacetal. The use of crosslinked polyvinylacetals is also possible. Methods for crosslinking polyvinylacetals are described, for example, in EP 1527107 B1 and WO 2004/063231 A1 (thermal self-crosslinking of carboxyl group-containing polyvinylacetals), EP 1606325 A1 (polyvinylacetals crosslinked with polyaldehydes) and WO 03/020776 A1 (polyvinylacetals crosslinked with glyoxylic acid).

The films A and/or B can contain, as plasticizers WA and WB, respectively one or more compounds selected from the following groups:

Esters of polyhydric aliphatic or aromatic acids, such as dialkyladipate, dihexyladipate, dioctyladipate, hexylcyclohexyladipate, mixtures of heptyl and nonyladipates, diisononyladipate, heptylnonyladipate, and esters of adipic acid with cycloaliphatic or ether compounds containing ester alcohols, dialkylsebacates such as dibutylsebacate and esters of sebacic acid with cycloaliphatic or ether compounds containing ester alcohols, esters of phthalic acid such as butyl benzyl phthalate or bis-2-butoxyethylphthalate; Esters or ethers of polyhydric aliphatic or aromatic alcohols or oligoether glycols with one or more unbranched or branched aliphatic or aromatic substituents, such as esters of glycerine and di-, tri- or tetraglycols with linear or branched aliphatic or cycloaliphatic carboxylic acids. Examples include diethyleneglycol-bis-(2-ethylhexanoate), triethyleneglycol-bis-(2-ethylhexanoate), triethyleneglycol-bis-(2-ethylbutanoate), tetraethyleneglycol-bis-n-heptanoate, triethyleneglycol-bis-n-heptanoate, triethyleneglycol-bis-n-hexanoate, tetraethylenglycoldimethylether and dipropylene glycol benzoate;

Phosphate of aliphatic or aromatic ester-alcohols such as tris(2-ethylhexyl)phosphate (TOF), triethylphosphate, diphenyl-2-ethylhexyl phosphate, and tricresylphosphate; and Esters of citric acid, succinic acid and fumaric acid.

By definition, plasticizers are high-boiling organic liquids. For this reason, other types of organic liquids having a boiling point higher than 120° C. may also be used as plasticizers.

Most preferably, the films A in the variants in which a plasticizer WA is initially present in films A, as well as films B, contain as a plasticizer 1,2-cyclohexane dicarboxylic acid diisononyl ester (DINCH), or triethylene glycol-bis-2-ethylhexanoate ("3GO" or "3G8").

In addition, films A and B may further contain residual amounts of water, and one or more additives such as UV-absorbers, antioxidants, adhesion regulators, optical brighteners or fluorescent additives, stabilizers, colorants, processing aids, organic or inorganic nanoparticles, fumed silica and surface-active substances. In particular, film B can have, as adhesion regulators, 0.001 to 0.1% by weight of alkali and alkaline earth metal salts of carboxylic acids.

For suppression of corrosion effects of the heat shielding coatings introduced over film A in the laminated glass, in particular when using metallic conductor materials such as silver, it may be helpful to provide a corrosion inhibitor in the finished laminate. Preferably, the corrosion inhibitors may be included prior to lamination in film B and may transition during and after bonding with film A by diffusion also into the thinner film A or in the area of its coating.

Alternatively, before lamination, an anti-corrosion agent is already included in film A. Preference is given to corrosion inhibitors in percentages of 0.005-5% by weight in film B and/or A. Preference is given to the use of unsubstituted or substituted benzotriazoles as corrosion inhibitors.

To avoid corrosion of the heat shielding coating, film A preferably contains less than 150 ppm of chloride ions, nitrate ions and/or sulfate ions.

Thus, the chloride content of film A may be less than 150 ppm, preferably less than 100 ppm and in particular less than 50 ppm. Ideally, the chloride content of film A is less than 10 ppm or even 0 ppm.

The nitrate content of film A film may be less than 150 ppm, preferably less than 100 ppm, and particularly less than 50 ppm. Ideally, the nitrate content of film A is less than 10 ppm or even 0 ppm.

The sulphate content of film A may be less than 150 ppm, preferably less than 100 ppm and in particular less than 50 ppm. Ideally, the sulphate content of film A is less than 10 ppm or even 0 ppm.

In addition, film A may comprise more than 0 ppm magnesium ions. Preferably, the magnesium content is more than 5 ppm, most preferably more than 10 ppm, and especially 5-20 ppm.

It is possible, according to the invention, to first melt film A, either over the entire surface or locally, onto a glass pane at elevated temperature and then cover with film B. Alternatively, the films A and B can be positioned together between two panes of glass and fused at elevated temperature.

The sticking of the transparent panes, i.e. the lamination step for producing the laminated glass, is preferably carried out so that films A and B are positioned between two glass panes and the thus-prepared laminate is compressed under elevated or reduced pressure and at elevated temperature to form a laminate.

For lamination of the laminate assembly, methods known to those skilled in the art can be used, with or without previous preparation of a pre-laminate.

So-called autoclave processes are carried out at an elevated pressure of approximately 10 to 15 bar and temperatures of 100 to 145° C. over a period of about 2 hours. Vacuum bag or vacuum ring processes, for example according to EP 1,235,683 B1, operate at about 200 mbar and 130 to 145° C.

Use may also be made of so-called vacuum laminators. These consist of a heated and evacuated chamber, where laminated glazing can be laminated in 30-60 minutes. Reduced pressures from 0.01 to 300 mbar and temperatures from 100 to 200° C., in particular 130-160° C., have been proven successful in practice.

In the simplest case, for manufacturing the composite laminated glass, film A or B is positioned on a glass pane and to this end, synchronously or subsequently, the further film B or A is positioned. Thereafter, the second glass pane is applied and forms a glass/film composite. Excess air can then be removed using any pre-composite method known to the skilled in the art. Here, a first light bonding between the layers and with the glass already takes place.

The glass film composite can be finally subjected to an autoclave process. Preferably, film A is positioned on the first glass pane and is covered with the thicker film B, before the second glass pane is placed. The method can be performed in many conceivable and essentially practicable variants. For example, film A is simply removed from a roll of appropriate width while film B is previously cut to the size of the composite glass. This is especially advantageous in the case of windshields and other automotive glazing areas. In this case it is particularly advantageous to additionally stretch the thicker film B before cutting to size. This allows for a more economical use of the film or, in the event that film B has a color wedge, for conforming the curvature to the upper edge of the pane.

In the automotive sector, in particular for the production of windshields, films are often used which have a so-called color ribbon at the top. For this purpose, either the upper part of the films A and B may be co-extruded with a correspondingly colored polymer melt or, in a multi-layer system, one of films A and B may have areas of different color. In the present invention this can be realized by complete or partial coloring of at least one of films A and B.

According to the invention, films B may therefore have a color wedge, which has already been adapted, in an upstream process step, to the geometry of a windshield.

It is also possible that films B have a wedge-shaped thickness profile. In this case, the laminated glass composite of the invention achieves a wedge-shaped thickness profile even with a plane-parallel thickness profile of film A, and can be used in car windshields for HUD displays.

In the simplest case, film B is a commercially available PVB film with or without a ribbon and with or without a wedge-shaped thickness profile. Also, films B can be used with dispersed nanoparticles and colored films for IR protection. Of course, film B can also be a film with an acoustic function, so that by combining with a film A, improved sound insulation properties are obtained. Obviously, film B can already combine several of these features in itself.

The preparation of the thin films A is generally carried out by extrusion using a cast film line or as a blown film. Surface roughness can be obtained by controlled flow breaks or in a cast film process, or additionally, by using a structured chill roll.

In addition, a regular, non-stochastic roughness may be impressed to an already produced film by using an embossing process between at least one pair of rolls. Preferably, films used in the invention have a one-sided surface structure with a roughness Rz of 0 to 25 μm, preferably an Rz of 1-20 μm, more preferably an Rz of 3-15 μm and especially an Rz of 4-12 μm. It is particularly preferred that the side of film coming into contact with the glass pane has a surface roughness Rz of less than 20% of its thickness. A surface provided with an electrically conductive structure preferably comprises, before application of the coating, a particularly low surface roughness. In particular, in this case, the roughness parameter Ra is less than 3 μm and Rz is less than 5 μm.

EXAMPLES

Films for examples 1-4 were produced on a small extruder with a cooling drums unit, having a width of 35 cm, in the thicknesses and with the quantities and types of plasticizers set forth in Table 1. The polyvinyl butyral used (Mowital® B60H Kuraray Europe GmbH) had a PVOH content of 19.8% by weight and a residual acetate content of 1% by weight.

The initial films A were manually provided with the coating specified in the table (Examples 2, 3, 4). The application was carried out in suspension with a laboratory coater, and after drying resulted in a layer thickness of the coating of about 5 μm. The films were stored at 23° C. and 23% relative humidity prior to further processing.

TROSIFOL VG R10 0.76 is a commercial undyed, standard automotive film with uniform thickness profile for lamination of windshields with a thickness of 760 μm, with a plasticizer content of 27.5% by weight. The PVB batch used for production had a PVOH content of 20.3 wt % by weight. The glass transition temperature (Tg) was measured to be 19.2° C.

All films were stored for 24 hours at 23° C. and 23% residual humidity before deploying. To prepare the test laminates, plane glasses of the type PLANILUX® (St.

Gobatin), having a thickness of 2.1 mm and 30×30 cm edge length, were washed with an industry-standard glass washing machine.

The lower panes were placed on a deployment table and films A of Examples 1-4 were each unwound from a roll and overlaid onto the glass. Next, a layer of film B (TROSIFOL VG R10) was placed over the film A before the sandwich was completed by applying the upper Planilux® pane. Protruding film was separated on edge with a sharp knife. The sandwiches were prebonded by an industry standard cylinder-pre-laminating system, so that the glass surface temperature at the exit from the system was 65° C., and finally they were bonded to form the final laminate in an autoclave for 90 minutes, at up to 140° C. and at a pressure of 12 bar.

By combining the heat shielding coated films A of Examples 2-4 with the commercially available standard foil TROSIFOL VG R10 (film B) test laminates with good heat-shielding properties could therefore be easily manufactured. On test laminates light transmission was determined in accordance with EN 410 and Total Solar Transmittance (TTS, v=14 m/s) was determined according to ISO 13837.

TABLE 1

|  | Comparison 1 | Example 2 | Example 3 | Example 4 | -Film B |
|---|---|---|---|---|---|
| Film | A | A | A | A | B |
| Polyvinylbutyral % by weight | 100 | 100 | 100 | 95 | 72.5 |
| PVOH (% by weight, referred to PVB) | 19.8 | 19.8 | 19.8 | 19.8 | 20.3 |
| Plasticizer 3G8 % by weight | 0 | 0 | — | — | 25 |
| HEXAMOLL® DINCH % by weight | — | — | 0 | 5 | — |
| Plasticizer DBEA % by weight |  |  |  |  | 2.5 |
| Coating | absent | ATO | ITO | ITO | — |
| Type of binder | — | PVA | PVB | PVB | — |
| Film thickness (μm) | 40 | 45 | 52 | 66 | 760 |
| Tg in initial conditions (° C.) | 68 | 68 | 68 | 61 | 19.2 |
| TL (EN 410) in % | 89.9 | 78.8 | 84.5 | 82.3 | — |
| TTS (ISO 13837) in % | 79.7 | 61.5 | 61.8 | 59.0 | — |

The invention claimed is:

1. A method for the production of heat shielding laminated glass composites, comprising laminating two transparent panes with at least one film A and at least one film B positioned between the two transparent panes, wherein film A comprises a polyvinylacetal PA and from 0 to 16% by weight of at least one plasticizer WA and further comprises a heat shielding coating, and film B comprises a polyvinylacetal PB and at least 16% by weight of at least one plasticizer WB, and wherein, prior to laminating film A has a thickness of not more than 20% of the thickness of film(s) B.

2. The method of claim 1, wherein the heat-shielding coating of film A comprises at least one of indium tin oxide (ITO), antimony tin oxide (ATO), antimony zinc oxide (AZO), indium zinc oxide (IZO), zinc antimonate, tin-doped zinc oxide, silicon-doped zinc oxide, gallium-doped zinc oxide, $LiWO_3$, $NaWO_3$, $CsWO_3$, lanthanum hexaboride, or cerium hexaboride.

3. The method of claim 2, wherein the heat-shielding coating has a thickness of from 1 to 50 μm.

4. The method of claim 1, wherein the heat-shielding coating of film A comprises at least one of silver, aluminum, gold, chromium or indium.

5. The method of claim 4, wherein the heat shielding coating has a thickness of 0.01-5 μm.

6. The method of claim 1, wherein film A comprises a polyvinylacetal PA with a content of vinyl alcohol groups of from 6 to 26% by weight and film B comprises a polyvinylacetal PB having a content of vinyl alcohol groups of from 14 to 26% by weight.

7. The method of claim 1, wherein film A, in an edge region, is at least 1 mm smaller than at least one glass pane such that film B is in direct contact with at least one glass pane in this edge region.

8. The method of claim 1, wherein film A has at least one recess, such that film B is in direct contact with at least one glass pane through this recess.

9. The method of claim 1, wherein film B comprises at least two films B' and B" which have different plasticizer contents.

10. The method of claim 1, wherein film B has a wedge-shaped thickness profile.

11. The method of claim 1, wherein film B has a colored partial area.

12. The method of claim 1, wherein film A comprises less than 150 ppm of chloride ions, nitrate ions, and/or sulfate ions.

13. The method of claim 1, wherein film A comprises more than 0 ppm of magnesium ions.

14. The method of claim 1, wherein the transparent panes are interconnected by a layer sequence film A/film B/film A.

15. The method of claim 1, wherein the transparent panes are connected to each other by a layer sequence film B/film A/film B.

16. The method of claim 1, wherein the plasticizer WA content of film A, in an initial state, is less than 6% by weight relative to the total weight of film A.

17. The method of claim 1, wherein film A in an initial state is free of plasticizer.

* * * * *